(No Model.)
J. B. JOHNSON.
TRANSPLANTER.
No. 310,592. Patented Jan. 13, 1885.
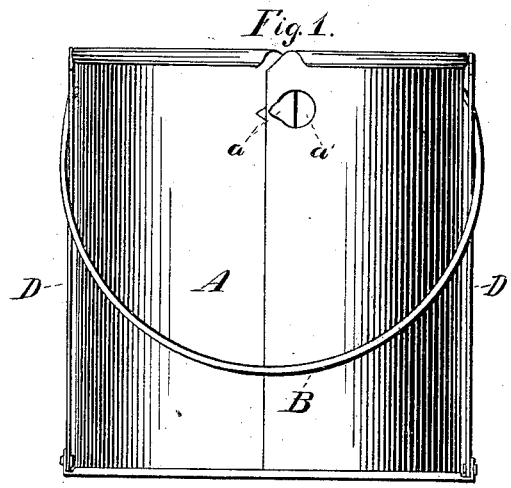
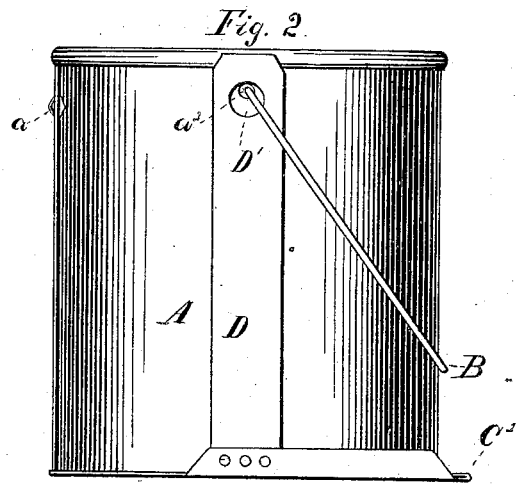
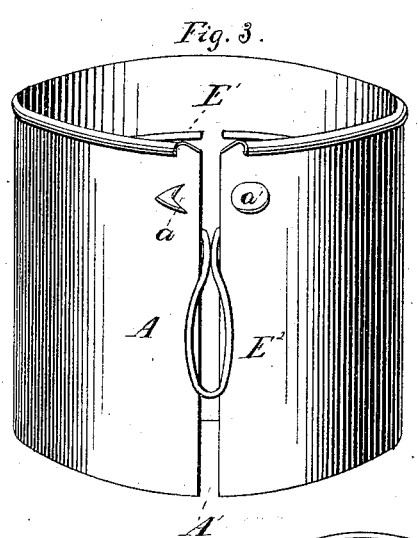
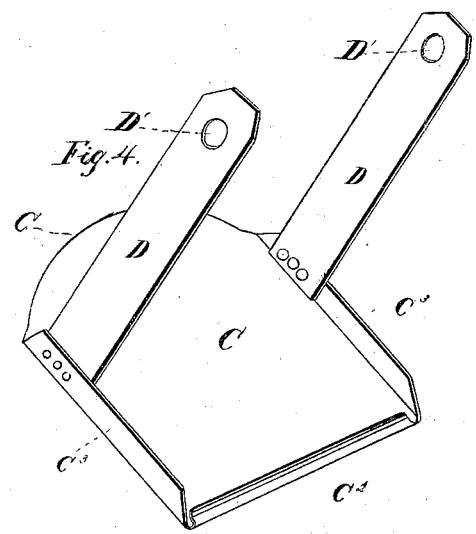
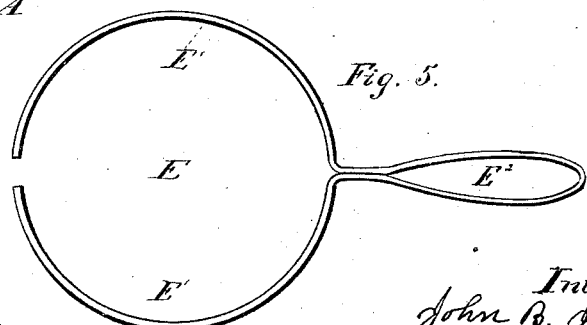
Witnesses.
R. B. Murphy
Geo. Y. Kauffman.
Inventor.
John B. Johnson
By R. S. & A. P. Lacey
Attys.
N. PETERS. Photo-Lithographer. Washington. D. C.

UNITED STATES PATENT OFFICE.

JOHN B. JOHNSON, OF JUDSONIA, ARKANSAS.

TRANSPLANTER.

SPECIFICATION forming part of Letters Patent No. 310,592, dated January 13, 1885.

Application filed June 7, 1884. (No model.)

*To all whom it may concern:*

Be it known that I, JOHN B. JOHNSON, a citizen of the United States, residing at Judsonia, in the county of White and State of Arkansas, have invented certain new and useful Improvements in Transplanters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to transplanters, and has for its object simple, inexpensive, and easily-operated devices whereby growing plants may be taken from hot-beds, cold frames, or elsewhere, and set out in garden or field without affecting the roots thereof, as will be presently described.

It consists in an elastic tubular-formed carrier, also in the discharger, and in the bottom, all constructed and arranged substantially as will hereinafter more fully be described and claimed.

In the drawings, Figure 1 is a back and Fig. 2 a side view of my transplanter. Fig. 3 is a detail perspective representing the carrier and discharger as in operation. Fig. 4 is a perspective detail of the discharger. Fig. 5 is a detail view of the discharger.

The carrier A is made of any suitable thin elastic metal, usually sheet-iron, and is composed of a strip bent into tubular form, and having its edges brought close together, with a slight space, A', between them, as shown in Fig. 3, except when such ends are connected, as shown in Fig. 1. This connection may be made in various ways, but I prefer that shown, consisting in forming one end with a hook, $a$, and the other with an eye, $a'$, fitted to be engaged by said hook, as shown in Fig. 1. I arrange this connection, it will be seen, near the upper edge of the carrier. By preference I wire the upper edge of the carrier, so as to increase the elasticity and strength of same, as well as to avoid the sharpness of the metal and provide a good bearing-surface against which pressure may be applied in the operation of the device. Holes $a^2 a^2$ are formed through the carrier near its upper edge to enable the ready connection of bail B, which is attached and detached in the use of the invention, as will be presently more fully explained.

The removable bottom is composed of the plate C, having one edge, C', suitably formed to be pushed through the ground, and its other edge, $C^2$, preferably turned, to serve as a stop and as a bearing for the hand of the operator in forcing the bottom through the earth to proper position. This bottom may also have side flanges, $C^3$, and is provided with arms D, secured at their lower ends to the bottom, and having their upper ends provided with openings D', arranged so as to register with the bail-openings in the carrier, when such parts are being used together, as shown in Figs. 1 and 2. By such arrangement I secure the bottom and carrier together, and support both such parts directly by the bail, as will be seen in Fig. 2.

The discharger E consists of a piece of wire or metal rod bent to form the semicircular spring-arms E' E' and the handle $E^2$, the arms being conformed to the inner side of the carrier, and so as to bear easily against such side in use, while the handle $E^2$ extends outward through opening A', as will be seen in Fig. 3.

It is manifest the specific construction of the parts before described may be varied from without departing from the broad principles of my invention.

I will now describe the operation of my invention. The carrier is coupled at its ends and placed over the plant, its sharp edge bearing on the ground. It is now pressed into the ground until its lower edge is below the roots of the plant to be transplanted. The ground to one side of the carrier is removed to permit the bottom to be slipped under the lower edge of the carrier, when such bottom is moved to the position shown in Fig. 2. The bail is then applied, as shown, and the plant, with the immediately surrounding soil, is conveyed within the carrier to the point where it is desired to plant, at which place a suitable hole has been formed, in which the carrier is placed and the bottom removed. Earth is now placed loosely around the carrier and its ends are unhooked. The discharger is now applied on the earth, as shown in Fig. 3, and the carrier is lifted, the discharger holding the soil from rising with the carrier, as will be understood. I prefer to use this discharger, though its form may be varied, and it will be seen that in some cases the discharger could be dispensed with and the hand used to prevent the rising of the soil, as the unhooking of the ends of the carrier will loosen the soil from the inner sides thereof. In transplanting small plants in which the diameter of the carrier is but a few inches, it is not ordinarily necessary to use the bottom; but in using carriers of larger diameter it becomes indispensable.

Having thus described my invention, what I claim, and desire to secure by Letters Patent, is—

1. The transplanter herein described, consisting of the carrier bent into tubular form and having its edges detachably connected, the bail, the bottom supported by the bail, and the discharger, having spring-arms E', adapted to bind snugly against the inner side of the carrier, and having its handle $E^2$ extended out between the separated edges thereof, substantially as set forth.

2. The herein-described transplanter, consisting of the carrier formed of an elastic plate bent into tubular form, and having its ends detachably connected, the bottom plate having arms lapped alongside of and secured and supported by the bail, and the bail, all arranged and adapted for use substantially as set forth.

3. A transplanter comprising a tubular carrier open at both ends, a bail attached to said carrier, and a removable bottom supported by the bail, substantially as set forth.

In testimony whereof I affix my signature in presence of two witnesses.

JOHN B. JOHNSON.

Witnesses:
FRED S. BARKER,
P. L. BARKER.